Figure 1:
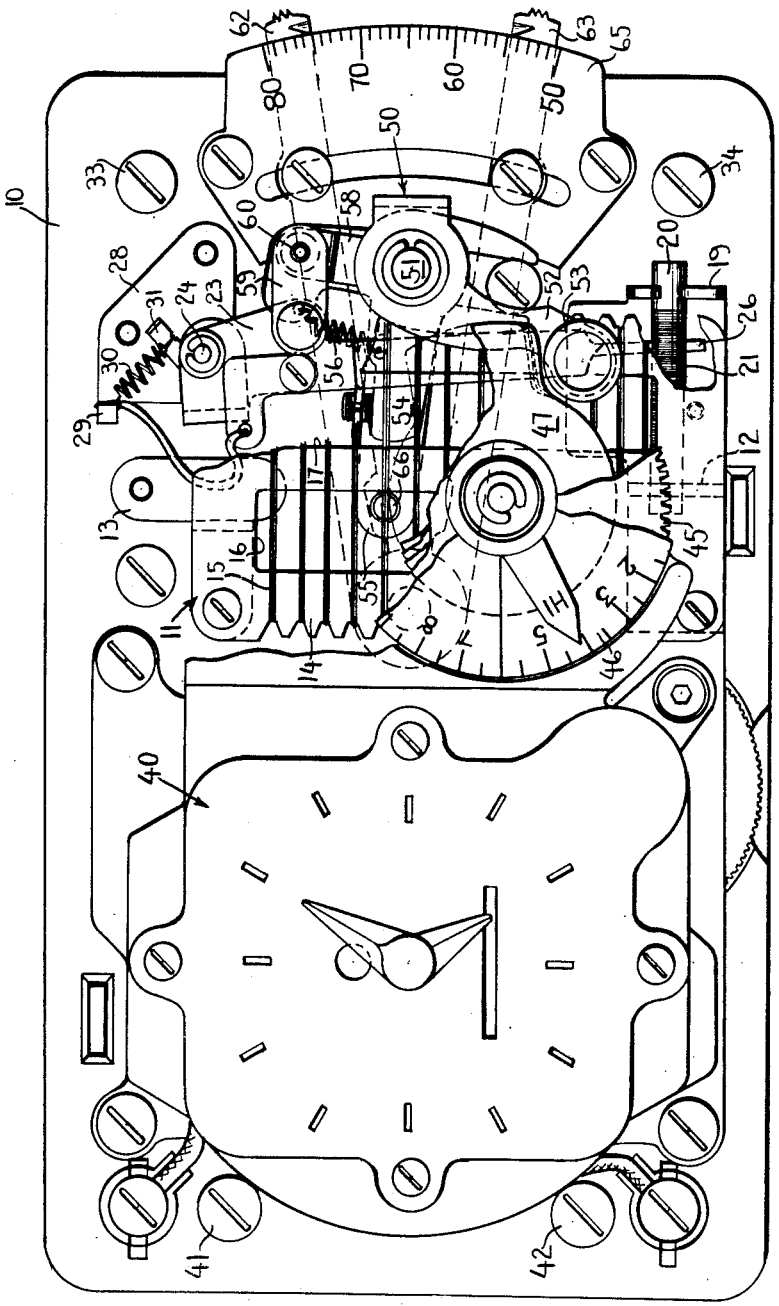

Jan. 20, 1953　　　　　　S. W. NICKELLS　　　　　2,626,379
　　　　　　　　　　　　　　　THERMOSTAT
Filed Oct. 18, 1948　　　　　　　　　　　　　　　　3 Sheets-Sheet 1

INVENTOR.
STANLEY W. NICKELLS
BY George H Fisher
ATTORNEY

Jan. 20, 1953 S. W. NICKELLS 2,626,379
THERMOSTAT
Filed Oct. 18, 1948 3 Sheets-Sheet 2
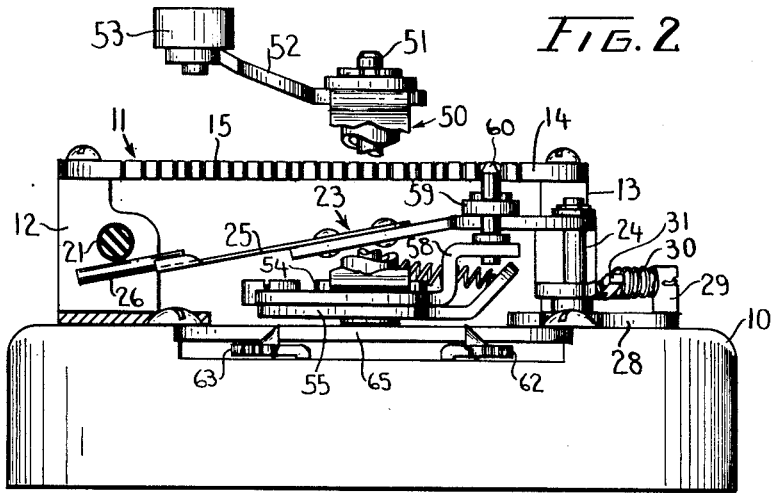
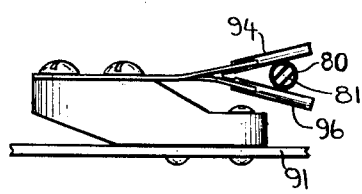
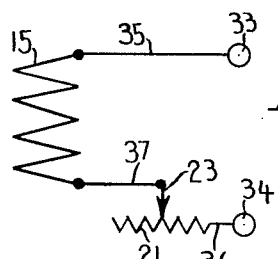
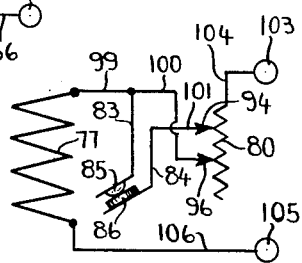
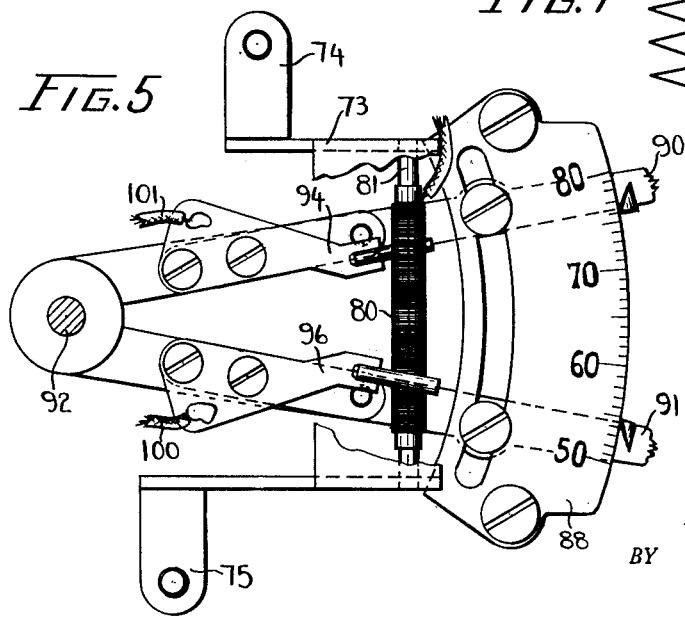
INVENTOR.
STANLEY W. NICKELLS
BY George H. Fisher
ATTORNEY

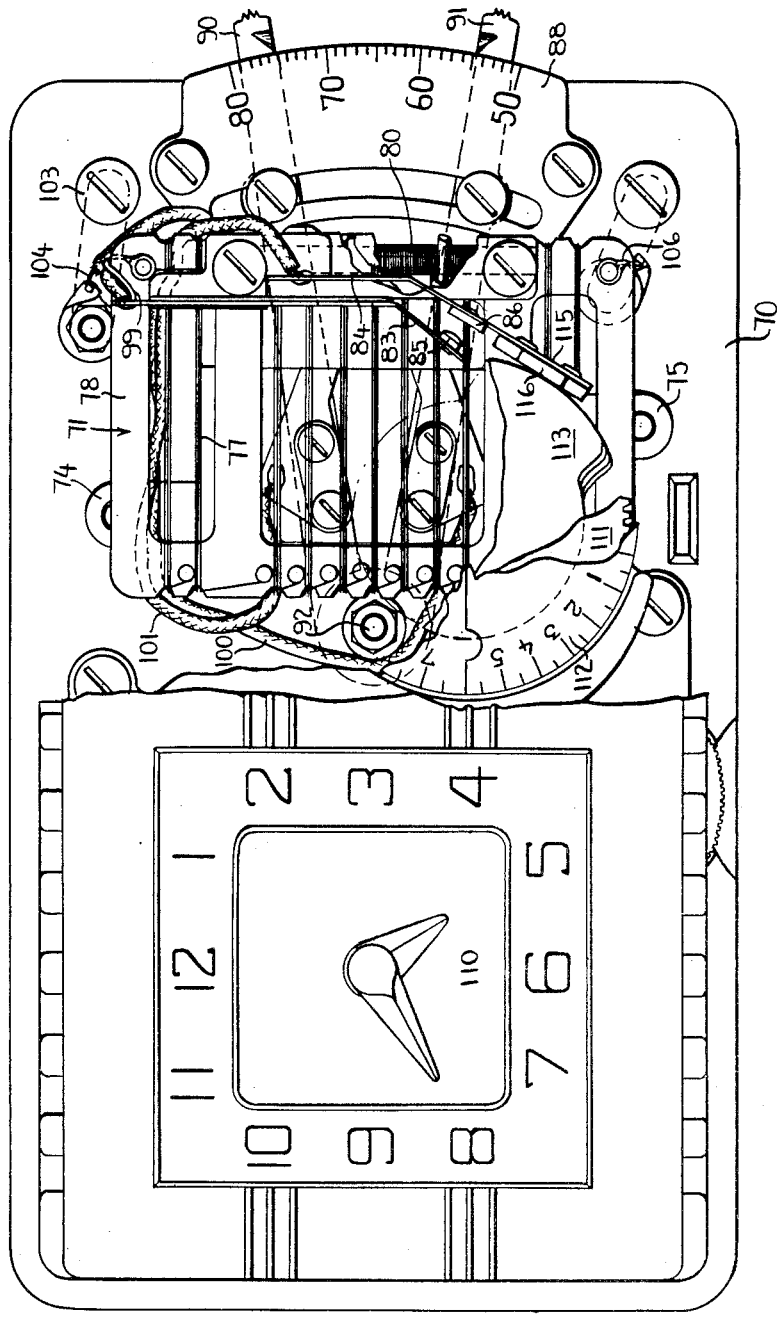

Patented Jan. 20, 1953

2,626,379

UNITED STATES PATENT OFFICE 2,626,379

THERMOSTAT

Stanley W. Nickells, St. Louis Park, Minn., assignor to Minneapolis-Honeywell Regulator Company, Minneapolis, Minn., a corporation of Delaware Application October 18, 1948, Serial No. 55,058

11 Claims. (Cl. 323—69)

This invention relates to thermostats of the type in which the sensing element is an electrical resistance element made of a material the resistance of which changes on changes in temperature. More particularly the invention is directed to control point adjusting means for such a thermostat.

An object of the invention is to provide a clock thermostat in which the temperature sensing element is a temperature sensitive resistance.

Another object of the invention is to provide a resistance thermostat in which a desired control point may be preselected together with means for shifting to such preselected control point.

Another object of the invention is to provide a resistance thermostat that will automatically change its effective resistance thereby to change its control point at predetermined times.

Another object is to provide a thermostat in which a temperature sensitive resistance, an adjustable resistance and a clock motor cooperate to determine the effective resistance between the thermostat terminals, and therefore the control point of the device.

Other objects will appear from the written description and claims and from the drawing, in which:

Figure 1 is a front elevation of a clock thermostat having a temperature responsive resistance element with portions broken away for the sake of clarity, and with the cover removed, Figure 2 is a fragmentary end view of the instrument of Figure 1, Figure 3 is an internal wiring diagram of the device of Figures 1 and 2, Figure 4 is a front elevation of a clock thermostat embodying a modified form of the invention, Figure 5 is a fragmentary view showing the temperature setting arms and adjustable resistance in somewhat more detail than shown in Figure 4, Figure 6 is a detailed view of the adjusting resistance of Figures 4 and 5, and Figure 7 is an internal wiring diagram of the device of Figures 4, 5 and 6.

It is well known in the thermostat art to provide a thermostat with a clock motor to change the control point at predetermined times, for instance to raise the room temperature at a predetermined time in the morning to a predetermined value, or to provide reduced room temperature during periods of non-occupancy. The known types of clock thermostats, however, have employed sensing elements that change in physical shape on temperature change, e. g., a bimetal element. In such devices the temperature sensing element actuates a control element which may be electrical contacts, an adjustable resistance or a pilot valve. Control point adjustment is usually obtained by varying the relation between the sensing element and the control element, although it may be varied by changing the amount of artificial heat supplied to the temperature responsive element by means of an electric heater adjacent thereto.

In the case of a resistance thermostat, control point can be changed by changing the length of the temperature sensitive wire, but as a practical matter it is more convenient to connect a rheostat of some form in series with the sensing wire. In the illustrative embodiment of the invention, the thermostat base carries both a temperature sensitive resistance and an adjusting resistance, the adjusting resistance being variable by a cam that is rotated once every twenty-four hours to determine which of two manually selected resistance values is effectively in circuit with the temperature sensitive resistance.

The device illustrated in Figures 1, 2 and 3 of the drawing is provided with a base 10, preferably of some insulating material, that is adapted to be secured to the wall of a room. A temperature responsive resistance element 11 is carried by the base 10 on a pair of brackets 12 and 13. The resistance element 11 comprises a flat rectangular spool 14 that is notched along opposite edges, and a temperature sensitive resistance wire 15 is wound on the spool 14 with a plurality of turns lying in each of the notches. The spool 14 is perforated at 16 and 17 to provide free circulation of air over much of the resistance wire 15. By winding the wire 15 so that a plurality of turns lie in each of the notches and dipping the entire unit in a suitable varnish after it is wound, considerably more mechanical strength is provided than if the wires were uniformly spaced along the length of the spool 14, while maintaining a desired degree of sensitivity.

Also carried by the bracket 12 and an extension 19 thereof, is a round spool of insulating material 20 on which is wound a plurality of turns of resistance wire 21. A slider 23 is pivoted on the base 10 on a pin 24, and is provided with a flexible strip 25 which maintains a contact piece 26 in engagement with the resistance wire 21. The pin 24 is carried by a bracket 28 having a bent up ear 29 to which one end of a tension spring 30 is attached. The other end of the spring 30 engages an ear 31 that is integral with the slider 23, so that the spring 30 biases the slider 23 toward the right hand end of the resistance 21, as seen in Figure 1.

The base 10 carries a pair of terminals 33 and 34 which are connected to the temperature responsive resistance 15, the slider 23, and the resistance 21 as shown in Figure 3. A conductor 35 interconnects one end of the temperature responsive resistance wire 15 and the terminal 33. A conductor 36 interconnects one end of the resistance wire 21 and the terminal 34, and a conductor 37 interconnects the slider 23 and the opposite end of the temperature sensitive resistance 15. For the sake of clarity these conductors have been omitted from Figure 1, but are preferably located in a recessed portion on the underside of the base 10.

Also mounted on the base 10 is a clock 40 which may be of any suitable type but is preferably of the type adapted to be energized by regulated frequency alternating current. A pair of terminals 41 and 42, carried by the base 10, serve to electrically connect the clock motor to a suitable source of power. Since the clock motor is of conventional type and since for the present purpose the clock could also be a spring wound clock, the details thereof have not been illustrated. Besides the conventional time indicating hands, the clock motor also drives a gear 45 at one revolution in every 24 hours. A 24-hour dial 46 and a cam 47 are connected to the gear 45 and rotates as a unit therewith. The details of the cam 47 and the manner in which it may be adjusted with respect to the dial 46 is described in detail in the copending application of Carl G. Kronmiller, Serial No. 2,230, filed January 14, 1948, now Patent No. 2,558,617, and therefore no detailed description thereof is given here. It might be stated, however, that the raised periphery of the cam may be adjusted both as to extent and its relation to the 24-hour dial 46. The raised portion of the cam determines the portion of the day during which lower temperatures will be maintained as will appear hereinafter.

A cam follower assembly 50 is pivoted on a pin 51 which extends outwardly from the base 10 and normal thereto. The cam follower assembly together with the temperature setting arms to be described hereinafter is described in detail in the aforementioned Kronmiller application and it is not believed necessary to describe them in detail here. An arm 52 carries a roller 53 adapted to engage the cam 47. An arm 54 is integral with the arm 52 and normally is in engagement with an arm 55, both arms being pivoted on the pin 51. A spring 56 normally holds the arms 54 and 55 in engagement but if the arm 55 is stopped so as to prevent counterclockwise movement thereof the spring 56 will be elongated to permit continued counterclockwise movement of the arm 54. An arm 58 is positioned by the arm 55 and a link 59 which is attached to the arm 58 on a pin 60 interconnects the arm 58 and the slider 23.

A day temperature setting arm 62 and a night temperature setting arm 63 are pivoted in the base 10 and cooperate with indicia on a dial plate 65. Suitable friction means is provided between the arms 62 and 63 and the base 10 so that they will remain in adjusted position. The arm 55, described above, is provided with a pin 66 which extends between the two temperature setting arms to determine the position of the arm 58, link 59 and slider 23 during day operation when the roller 53 is out of engagement with the cam 47, and during night operation when the roller 53 is on the raised portion of the cam 47. It will be noted that the spring 30 acting between the base 10 and the slider 23 biases the slider in a counterclockwise direction, and through the link 59 biases the arm 58 and the arm 55 in a clockwise direction to hold the pin 66 against the temperature setting arm 62. Thus when the roller 53 is not in engagement with the cam 47 the position of the levers 55 and 58 and therefore of the slider 23 will be determined by the position of the temperature setting arm 62. When the raised portion of the cam 47 rotates the roller 53 and arm 52 in a counterclockwise direction the lever 55 will be brought into engagement with the temperature setting arm 63 and the arm 58 will position the slider 23 to a position on the resistance 21 determined by the adjusted position of the arm 63. The pin 66 will engage the arm 63 before the roller 53 is on the outer periphery of the raised portion of the cam and therefore further movement of the cam follower will separate the arms 54 and 55 and stretch the spring 56. Thus a spring release is provided to permit full movement of the cam follower regardless of the adjusted position of the arm 63. It will be noted that if the arms 62 and 63 are both set for the same temperature the cam will move only the arms 52 and 54 while the arms 55 and 58 remain stationary.

The electrical connection between the terminal 34 and the resistance 21 is such that a minimum of resistance is in the circuit between the terminal 34 and the slider 23 when the slider is at the right hand end of resistance 21 which is the position corresponding to the maximum possible temperature setting on the scale plate 65. Hence, as lower temperature settings are selected the amount of the resistance 21 in series with the temperature sensing resistance 15 is increased. The wire which forms the resistance 21 is preferably selected to have a negligible temperature coefficient. The difference in resistance included in the circuit by the slider 21 when the slider is at a position corresponding to the maximum possible temperature setting and when it is at a position determined by the minimum possible temperature setting corresponds to the difference in resistance of the temperature sensitive resistance 15 at the two temperatures. Thus, if the resistance 15 has a temperature coefficient of 2.2 ohms per degree Fahrenheit, then the amount of resistance 21 included in the circuit when the slider 23 is moved to its extreme left hand position must be 66 ohms greater than the resistance included at the extreme right hand position of the slider, since the maximum possible temperature setting is 30° higher than the minimum possible temperature setting. If the terminals 33 and 34 are connected into a control circuit such as described in Wilson et al. application Serial No. 6,754, filed February 6, 1948, now Patent No. 2,572,293, the device will control at the temperature selected on the indicia plate 65 since the control circuit will be in balance only at a predetermined value of the total resistance between the terminals 33 and 34. In order to prevent complete shutdown of the heating plant if the slider 23 should lose contact with the resistance 21, a conductor may be employed to interconnect the temperature sensitive resistance 15 and the left hand end of the resistance 21. In the illustrated device a temperature close to 50° F. would be maintained.

A modified form of the invention is shown in Figures 4, 5, 6 and 7 of the drawing. A base 70, preferably of insulating material, carries a temperature sensitive resistance element 71 in spaced relation thereto by means of a bracket 73 which is provided with mounting ears 74 and 75. The element 71 comprises a temperature sensitive resistance wire 77 which is wound on a flat rectangular spool 78. The spool 78 is notched on opposite edges and the wire 77 is wound so that a plurality of turns lie within each of the notches. The spool 78 is also apertured so that air may circulate freely over a large part of the resistance wire.

The bracket 73 also carries an adjusting resistance 80 which is wound on a rod 81. The bracket 73 also carries flexible blades 83 and 84 which carry a pair of cooperating contacts 85 and 86. The blades 83 and 84 are, of course, suitably insulated from each other and from the bracket 73 and wire 77 and are so formed that the contacts 85 and 86 are normally in engagement.

The base 70 is provided with a scale plate 88 that is provided with suitable indicia of temperature, and cooperating with the plate 88 is a pair of temperature setting arms 90 and 91. The arms 90 and 91 are pivoted in the base at 92. The arm 90 carries a slider 94 suitably insulated therefrom, which is adapted to cooperate with the resistance 80. Likewise, the arm 91 carries a slider 96 also adapted to cooperate with the resistance 80. It will be noted from Figures 5 and 6 that the sliders 94 and 96 are adapted to be positioned to provide the same value of the resistance 80 when the two arms 90 and 91 are positioned together to indicate the same temperature setting.

A conductor 99 electrically connects the upper end of the temperature responsive resistance 77 to the contact blade 83 and a flexible conductor 100 connects the blade 83 to the slider 96. Another flexible conductor 101 connects the slider 94 to the other flexible contact blade 84. A terminal 103 carried by the base 70 is connected to the upper end of the resistance 80 by a conductor 104, while another terminal 105 carried by the base 70 is connected to the lower end of the temperature sensitive resistance 77 by a conductor 106. When the contacts 85 and 86 are in engagement as shown in Figure 7 only the upper portion of the resistance 80 will be in the circuit. The circuit may be traced from the terminal 103 through the conductor 104, a portion of the resistance 80, slider 94, conductor 101, blade 84, contacts 85 and 86, blade 83, conductor 99, temperature sensitive resistance 77, and conductor 106 to the terminal 105.

A clock 110 is carried by the base 70 and is provided with the usual motor which is adapted to drive a gear 111 one revolution every 24 hours. The gear 111 also drives a 24-hour dial 112 and an adjustable cam 113. The clock mechanism, gear, dial and cam assembly may be as described and shown in Kronmiller application Serial No. 2,230, filed January 14, 1948, and no detailed description thereof will be given here. The cam 113 is adjustable with respect to the dial 112 so that the extent and relative position of the raised portion thereof may be adjusted. The spring blade 84 has an extension 115 that carries a cam follower 116. When the raised portion of the cam 113 engages the cam follower 116, the spring blade 84 will be bent to separate the contacts 85 and 86. The cam 113 is adjusted so that the contacts 85 and 86 will be separated during a predetermined desired portion of the (24 hour) day.

When the contacts 85 and 86 are separated the circuit between the terminals may be traced as follows: from the terminal 103 through the conductor 104, a portion of the resistance 80, slider 96, conductors 100 and 99, the temperature responsive resistance 77 and through the conductor 106 to the terminal 105. Under the usual conditions when the setting arm 90 is adjusted to a higher setting than the arm 91 there will be less resistance in series with the temperature responsive resistance when the cam follower 116 is off cam 13 and the contacts 85 and 86 are closed; hence, the resistance 77 must be raised to a higher temperature so that it will have a greater resistance in order to maintain a predetermined overall resistance between the terminals 103 and 105 than when the contacts 85 and 86 are open. When the contacts 85 and 86 are open a greater portion of resistor 80 will be included in the circuit and hence the temperature of the resistance 77 must be lowered to reduce its resistance in order that the total resistance between the terminals will remain constant.

In order to maintain a constant or predetermined overall resistance between the terminals at various temperature settings the possible range of adjustment of the slider on the resistance must be equal to the temperature coefficient of the temperature responsive resistance 77 multiplied by the possible range of temperature adjustment provided. In the illustrating case the setting arms 90 and 91 may be adjusted between control points of 50 and 80 degrees. Hence, if the temperature coefficient of the resistance 77 is 2.2 ohms per degree Fahrenheit the sliders 94 and 96 must be adjustable over a portion of the resistor 80 including 66 ohms. The terminals 103 and 105 may be connected to an electrical network and to a space heater affecting the temperature of the resistance 77 in the manner described in Wilson et al. Ser. No. 6,754, filed February 6, 1948. Such a system will act to increase the supply of heat when the resistance between the terminals drops below the predetermined value and to reduce the supply of heat when its resistance exceeds a predetermined value. The heater will be operated to supply heat to the space and to maintain the temperature of the resistance 77 at a value such that the resistance between the terminals 103 and 105 will be maintained at a predetermined constant value. Hence, the temperature that will be maintained will depend upon the adjusted position of the temperature setting arms 90 and 91 and by the position of the cam 113.

While the resistance 80 is preferably made of a material having negligible temperature coefficient it would be feasible to have this resistance also respond to space temperature. However, a tightly wound and rigidly supported resistance such as is most desirable for cooperation with the sliders 94 and 96 is necessarily slow to respond to temperature changes and the device would have the additional disadvantage that the indicia on the plate 88 would be non-linear. Obviously, the various operative elements of the circuit could be connected so that the resistance 80 is directly connected to the resistance 77 rather than to the terminal 103 as shown in Figure 7. In that case the two resistances would, in effect, be in the nature of a continuous resistance in which case the sliders 94 and 96 and the switch contacts 85 and 86 would be electrically connected between the resistance 80 and the terminal 103. A conductor (not shown) may be connected between the lower end of the resistance 80 and the upper end of the temperature sensitive resistance 77 to prevent complete shutdown of the system when the contacts 85—86 are open and in the event the slider 96 loses contact for any reason with the resistance 80. Another possible modification would be to connect the lower end of the resistance 80 to a third control circuit terminal on the base to permit use of the thermostat in connection with certain control circuits.

Various changes obviously could be made in the described embodiments of the invention without departing from the basic inventive concept. The scope of the invention is to be limited only by the appended claims.

I claim as my invention:

1. In a thermostat, in combination, a base, a pair of terminals on said base, a temperature responsive resistance carried on said base and electrically connected to one of said terminals, a mechanically adjustable resistance carried on said base and electrically connected to the other of said terminals, an electrical connection between said resistances, first and second manually adjustable means for preselecting two values of said adjustable resistance to be placed in series with said temperature responsive resistance, a motor on said base, and a mechanical linkage actuated by said motor determining which of said preselected resistance values of said adjustable resistance is effectively in series with said temperature responsive resistance and said terminals.

2. In a thermostat, in combination, a base, a temperature responsive resistance carried on said base, a rheostat on said base, means electrically connecting said resistance and said rheostat in series circuit with a pair of terminals on said base, a pair of manually positionable temperature setting arms for determining first and second effective resistance values of said rheostat, a motor on said base, and a shifting mechanism actuated by said motor for selecting at predetermined times the effective resistance of said rheostat as determined by one or the other of said setting arms.

3. In a thermostat, a base, a pair of terminals on said base, a temperature sensitive resistance carried on said base, an adjusting resistance element carried on said base, electrical connections between said resistances and between said resistances and said terminals, manually positionable means for preselecting two values of said adjusting resistance element in the circuit between said terminals, a clock motor, and a switch actuated by said motor, said switch being connected in said electrical connections to determine which of the two preselected values of said adjusting resistance element are effectively connected in series with said temperature sensitive resistance and said terminals.

4. In a thermostat, a base, a pair of terminals on said base, a temperature responsive resistance on said base, an adjusting resistance element, a pair of sliders engaging said adjusting resistance element, manually positionable means to position said sliders on said resistance, electrical conductors connecting one end of said adjusting resistance element and one of said sliders in series circuit with said temperature responsive resistance and one of said terminals, an electrical conductor between the other of said terminals and said temperature responsive resistance, a clock motor on said base, a switch actuated by said motor, and electrical conductors connecting said switch to each of said sliders.

5. In a thermostat, a base, a pair of terminals on said base, a temperature responsive resistance on said base, an adjusting resistance, a slider engaging said adjusting resistance, manually positionable means adapted to limit movement of said slider on said adjusting resistance, a clock motor on said base, a mechanical linkage including a strain release interconnecting said slider and said motor, and conductors electrically connecting said terminals, said temperature responsive resistance, said slider and said adjusting resistance.

6. In a thermostat, a base, a pair of terminals on said base, a temperature responsive resistor and an adjusting resistance element on said base, said adjusting resistance being substantially insensitive to temperature variations, a pair of manually positionable pivoted arms each carrying a slider adapted to wipe over said adjusting resistance element, indicia of temperature on said base adapted to cooperate with indicia on said arms, electrical connections between said temperature responsive resistor, said adjusting resistance element, said terminals and said sliders, a motor on said base, and a switch in said electrical connections, said switch being actuated by said motor at predetermined times to determine which of said sliders determines the effective value of said adjusting resistance element in series with said temperature responsive resistor.

7. In a thermostat, in combination, a base, a pair of terminals on said base, a temperature sensitive resistance carried by said base, adjusting resistance means carried by said base, said adjusting resistance means being substantially insensitive to temperature variations, electrical connections between said temperature sensitive resistance, said adjusting resistance and said terminals, stationary indicia of temperature carried by said base, first and second manually positionable means each bearing indicia cooperable with said stationary indicia, connecting means between said manually positionable means and said adjusting resistance means, a clock motor on said base, and a shifting mechanism actuated by said motor for selecting at predetermined times effective resistance values of said adjusting resistance means as determined by the adjusted positions of said manually positionable means.

8. In a room thermostat, the combination of, a base, a scale bearing indicia of temperature on said base, a pair of manually positionable members coaxially pivoted on said base and each carrying an index cooperating with said scale, cooperating abutments on said members limiting movement of the index on one of said members to the portion of said scale not occupied by the index on the other of said members and causing coincidence of said indexes on said scale when in engagement, an elongated resistance element on said base, a slider carried by one of said members engaging one side of said element, and a slider carried by the other of said members engaging the opposite side of said element, said sliders being so disposed on said members as to include substantially zero resistance therebetween when said indexes are in coincidence on said scale.

9. In a room thermostat, the combination of, a base, a scale bearing indicia of temperature on said base, a pair of manually positionable members coaxially pivoted on said base and each carrying an index cooperating with said scale, cooperating abutments on said members limiting movement of the index on one of said members to the portion of said scale not occupied by the index on the other of said members and causing coincidence of said indexes on said scale when in engagement, an elongated resistance element on said base, a slider carried by one of said members engaging one side of said element, a slider carried by the other of said members engaging the opposite side of said element, said sliders being so disposed on said members as to include substantially zero resistance therebetween when said indexes are in coincidence on said scale, a temperature responsive resistance element carried on said base, electrical connections between said temperature responsive resistance and said sliders and switching means in said connections for determining which of said sliders selects the portion of said first mentioned resistance of effectively in circuit with said temperature responsive resistance.

10. In a room thermostat, the combination of, a base, a scale bearing indicia of temperature on said base, a pair of manually positionable members coaxially pivoted on said base and each carrying an index cooperating with said scale, cooperating abutments on said members limiting movement of the index on one of said members to the portion of said scale not occupied by the index on the other of said members and causing coincidence of said indexes on said scale when in engagement, an elongated resistance element on said base, a slider carried by one of said members engaging one side of said element, a slider carried by the other of said members engaging the opposite side of said element, said sliders being so disposed on said members as to include substantially zero resistance therebetween when said indexes are in coincidence on said scale, a temperature responsive resistance element carried on said base, electrical connections between said temperature responsive resistance and said sliders, switching means in said connections for determining which of said sliders select the portion of said first mentioned resistance effectively in circuit with said temperature responsive resistance, a clock motor on said base, and a linkage actuated by said motor interconnecting said motor and said switching means for actuating said switch at predetermined times.

11. In an adjustable resistance, a base, a scale bearing indicia on said base, a pair of manually positionable members coaxially pivoted on said base and each carrying an index cooperating with said scale, cooperating abutments on said members limiting movement of the index on one of said members to the portion of said scale not occupied by the index on the other of said members and causing coincidence of said indexes on said scale when in engagement, an elongated resistance element on said base, a slider carried by one of said members engaging one side of said element, and a slider carried by the other of said members engaging the opposite side of said element, said sliders being so disposed on said members as to include substantially zero resistance therebetween when said indexes are in coincidence on said scale.

STANLEY W. NICKELLS.

REFERENCES CITED

The following references are of record in the file of this patent:

UNITED STATES PATENTS

| Number | Name | Date |
|---|---|---|
| 854,121 | Storer | May 21, 1907 |
| 903,640 | Wappler | Nov. 10, 1908 |
| 1,757,951 | Breese, Jr. | May 13, 1930 |
| 2,092,327 | Persons | Sept. 7, 1937 |
| 2,096,663 | Woodley | Oct. 19, 1937 |
| 2,123,725 | Handweak | July 12, 1938 |
| 2,136,559 | Miller | Nov. 15, 1938 |
| 2,236,624 | Littwin | Apr. 1, 1941 |
| 2,335,403 | Gallagher | Nov. 30, 1943 |
| 2,482,820 | Wolfson et al. | Sept. 27, 1949 |
| 2,488,110 | Aitken | Nov. 15, 1949 |

FOREIGN PATENTS

| Number | Country | Date |
|---|---|---|
| 580,729 | France | Nov. 14, 1924 |